US008388868B2

(12) United States Patent
Easter

(10) Patent No.: US 8,388,868 B2
(45) Date of Patent: Mar. 5, 2013

(54) VULCANIZABLE COPOLYMER SEMICONDUCTIVE SHIELD COMPOSITIONS

(75) Inventor: Mark R. Easter, Indianapolis, IN (US)

(73) Assignee: General Cable Technologies Corporation, Highland Heights, KY (US)

( * ) Notice: Subject to any disclaimer, the term of this patent is extended or adjusted under 35 U.S.C. 154(b) by 274 days.

(21) Appl. No.: 12/697,807

(22) Filed: Feb. 1, 2010

(65) Prior Publication Data

US 2011/0186328 A1 Aug. 4, 2011

(51) Int. Cl.
*H01B 1/00* (2006.01)
*H01B 1/06* (2006.01)
*B05C 5/02* (2006.01)

(52) U.S. Cl. .................. 252/511; 174/102 SC; 156/356

(58) Field of Classification Search ....... 252/500–521.6, 252/511; 174/102 SC; 156/356
See application file for complete search history.

(56) References Cited

U.S. PATENT DOCUMENTS

| | | | | |
|---|---|---|---|---|
| 3,849,333 | A | 11/1974 | Lloyd et al. | |
| 4,305,849 | A | 12/1981 | Kawasaki et al. | |
| 4,612,139 | A | 9/1986 | Kawasaki et al. | |
| 4,857,232 | A | 8/1989 | Burns, Jr. | |
| 5,246,783 | A | 9/1993 | Spenadel et al. | |
| 5,556,697 | A | 9/1996 | Flenniken | |
| 5,877,250 | A | 3/1999 | Sant | |
| 5,889,117 | A | 3/1999 | Flenniken | |
| 5,919,565 | A * | 7/1999 | Gross | 428/379 |
| 6,086,792 | A | 7/2000 | Reid et al. | |
| 6,388,051 | B1 * | 5/2002 | Jow et al. | 528/502 R |
| 6,455,771 | B1 | 9/2002 | Han et al. | |
| 6,525,119 | B2 * | 2/2003 | Tsukada et al. | 524/263 |
| 6,864,429 | B2 | 3/2005 | Easter | |
| 2007/0012468 | A1 * | 1/2007 | Han et al. | 174/34 |
| 2008/0050588 | A1 * | 2/2008 | Broman et al. | 428/375 |
| 2008/0149363 | A1 * | 6/2008 | Han et al. | 174/102 SC |
| 2008/0190645 | A1 * | 8/2008 | Ericsson et al. | 174/120 SC |
| 2008/0226918 | A1 * | 9/2008 | Lee et al. | 428/408 |

FOREIGN PATENT DOCUMENTS

| | | | |
|---|---|---|---|
| JP | 61040348 | A | 2/1986 |
| JP | 61238840 | A | 10/1986 |
| JP | 0952985 | A | 2/1997 |
| JP | H09-052985 | * | 2/1997 |
| WO | 0140384 | A1 | 6/2001 |
| WO | 2007092454 | A1 | 8/2007 |

OTHER PUBLICATIONS

Kissing, Y.V. "Polyethylene, Linear Low Density" Kirk-Othmer Encyclopedia of Chemical Technology (2005).*
"Metallocene LLDPE resin," http://www.packworld.com/controls/motors/metallocene-lldpe-resin, Oct. 31, 1995.*
"Metallocene VLDPE is a tough new contender for flexible packaging," http://www.ptonline.com/articles/metallocene-vldpe-is-a-tough-new-contender-for-flexible-packaging, Jan. 2002.*

* cited by examiner

*Primary Examiner* — Mark Kopec
*Assistant Examiner* — Jaison Thomas
(74) *Attorney, Agent, or Firm* — Blank Rome LLP

(57) ABSTRACT

Semi-conductive or insulating compositions including an ethylene/octane or butene copolymer and at least one additional polymer, such LDPE, are described. The compositions may also include carbon black and other additives. The composition may be used as a semi-conductive layer in such applications as electrical cables.

16 Claims, No Drawings

VULCANIZABLE COPOLYMER SEMICONDUCTIVE SHIELD COMPOSITIONS

FIELD OF THE INVENTION

The present invention relates vulcanizable copolymer compositions useful in the preparation of semiconductive conductor shields in power cables and to semiconductive conductor shields and power cables utilizing the composition.

DESCRIPTION OF THE RELATED ART
BACKGROUND OF THE INVENTION

A typical insulated electric power cable generally comprises a conductor in a cable conductive core that is surrounded by several layers of polymeric materials including an inner semiconducting shield layer (conductor or strand shield), an insulating layer, an outer semiconducting shield layer (insulation shield), a metallic wire or tape shield used as the ground phase, and a protective jacket. Additional layers within this construction such as moisture impervious materials are often incorporated. The present invention pertains to the inner semiconducting shield layer, i.e., the conductor shield.

Semiconductive shields have been used in power cables as shields for the cable conductor and insulation for many years. The conductor shield is typically extruded over the cable conductor to provide a layer of intermediate conductivity between the conductor and cable insulation in the power cable. Conventional compositions for these conductor shields include a base polymer as the predominant component of the composition compounded with carbon black to provide conductivity for the composition and may include various additives.

The invention relates to semiconductive shields for use in electrical conductors such as power cables, and particularly to a vulcanizable semiconductive conductor or bonded insulation shield composition that exhibits improved physical properties and processability compared to known semiconductive conductor and bonded insulation shields.

The semiconductive shield used to screen the electrical conductor is conventionally formed by dispersing various furnace-type carbon blacks, such as ASTM N-472 or Cabot XC72® type grade carbon blacks, in an ethylene copolymer resin base. These furnace blacks often have poor dispersion characteristics in polymers and contribute high levels of ionic contaminants. Consequently, protrusions and contaminants occur at the cable's shield/dielectric interface, causing increased stress gradients in an electrical field. This electrical field enhancement, combined with the migration of water and ions into the insulation, may lead to the formation of water trees and subsequent dielectric breakdown and premature cable failure.

Other commercially available high performance semiconductive shield compositions contain other types of carbon blacks, such as acetylene blacks, and an ethylene/ethylacrylate copolymer, ethylene/vinylacetate copolymer, ethylene/butylacrylate copolymer or blends of these materials with polyethylene. These materials typically contain reduced levels of ionic contamination and exhibit good dispersion and very smooth extrusion surfaces. Such shield compositions have a high viscosity due to the high carbon black loadings needed to achieve adequate conductivities and, therefore, abrade and/or corrode cable extrusion equipment. This wear results in poor extrusion cable surfaces and interfaces, thus reducing the shield's electrical performance properties.

Efforts have been made to improve semiconductive shield compositions. High performance semiconductive conductor shield compositions that include an ethylene/vinyl acetate copolymer, acetylene carbon black, and an organic peroxide cross linking agent are often used for these applications. Vinyl acetate resins, however, may only be used with aluminum conductors because they are corrosive to copper conductors. Furthermore, high loadings of acetylene black combined with ethylene/vinyl acetate resin lead to the formation of acids in the extruder which then corrode and abrade extrusion die tooling, resulting in cable dimension variations over time.

The primary purpose of the semiconducting conductor shield between the conductor and insulation in an electrical power cable is to ensure the long term viability of the primary insulation. There is always a need for improved semiconductive conductor shield compositions that balance cost and performance.

U.S. Pat. No. 6,086,792 to Reid et al. discloses a semiconducting composition comprising an olefinic polymer and a carbon black with a particle size of at least 29 nm.

International Application WO 01/40384 to Achetee et al. discloses carbon blacks and semiconducting compositions where the carbon black has a particle size 22-39 nm, an Iodine Number from about 64 to about 120 mg/g and a tinting strength of about 90% or less.

U.S. Pat. No. 5,877,250 to Sant discloses carbon black and polymers containing carbon black, wherein the carbon black has a particle size not greater than 20 nm and an Iodine Number of 64-112 mg/g. It is disclosed that improved processability is imparted by the use of the particular carbon black, although the use of such a carbon black to manufacture a semiconductive composition is not disclosed.

U.S. Pat. No. 5,556,697 to Flenniken (Flenniken '697) discloses a Vulcanizable semiconductive shield compositions contain a linear, single-site catalyzed polymer formed by polymerizing ethylene with at least one comonomer selected from $C_3$ to $C_{20}$ alpha-olefins; a carbon black selected from furnace carbon blacks that contain ash and sulfur in amounts of 50 ppm or less. Flenniken '697 further discloses adding a ethylene vinyl acetate silane terpolymer. This has the disadvantage of reacting and cross linking with certain carbon blacks and over time in the presence of moisture. Because of this, the compound may be soft and prone to mar and scratch in the cable making equipment. A further disadvantage is that the conductor is not able to be preheated to a high temperature.

U.S. Pat. No. 6,864,429 to Easter discloses a semiconducting shield composition having enhanced electrical aging performance as measured by the accelerated water treeing test (AWTT) and the accelerated cable life test (ACLT). Carbon blacks used in the present invention have a particle size from about 15 to about 22 nanometers, preferably from about 18 nm to about 21 nm (as measured by ASTM D3849-89), an Iodine number from about 115 mg/g to about 200 mg/g, preferably from about 120 mg/g to about 150 mg/g (as measured by ASTM D 1510) and a DBP oil absorption of from about 90 $cm^3$/100 g to about 170 $cm^3$/100 g, preferably from about 110 $cm^3$/100 g to about 150 $cm^3$/100 g (ASTM D2414). N110 falls in this range. However, Easter doesn't disclose the effect of the polymer matrix.

U.S. Pat. No. 5,889,117 to Flenniken discloses a semiconductive or insulating composition including an ethylene/octene copolymer and at least one additional polymer, such as ethylene/vinyl acetate. The composition may also include carbon black and other additives. The composition may be used as a semi-conductive or insulating layer in applications such as electrical cables. A further advantage of the polymeric formulations claimed is that they blend well and exhibit lower adhesion to crosslinked polyethylene, thus providing increased and continued strippability of the resultant products. This decreased adhesion is preferable, for example, because it increases the strippability of the polymeric composition from other compositions to which it is adhered. For example, decreased adhesion in the case of electrical cable allows for easier strippability of the semi-conductive shield from an underlying insulating material, with concurrently decreased pick-off, i.e., decreased amounts of polymer material residue left on underlying layers. Flenniken '117 doesn't disclose improved AWTT performance. Ethylene/vinyl aceatate is also and expensive polymer costing the same or more than ethylene/octene copolymer International Application WO/2007/092454 to Kjellqvist, et al. discloses a polymer composite made from (i) a phase I material consisting essentially of a polar copolymer of ethylene and an unsaturated ester having 4 to 20 carbon atoms; (ii) a phase II material consisting essentially of a nonpolar, low density polyethylene; and (iii) a conducting filler material dispersed in the phase I material and/or the phase II material in an amount sufficient to be equal to or greater than the amount required to generate a continuous conducting network in the phase I and phase II materials. The invention also includes articles made from the polymer composite. This has the disadvantage of having a polymer copolymer and of having to control the dispersion of the phases to have a sufficiently fine conductive network.

Additional examples of polymer compositions used as shields in power cables are found in the disclosures of U.S. Pat. Nos. 4,612,139 and 4,305,846 to Kawasaki et al.; U.S. Pat. No. 6,455,771 to Han et al.; U.S. Pat. No. 4,857,232 to Burns, Jr.; and U.S. Pat. No. 3,849,333 to Lloyd et al.

It would be desirable to have a conductor shield material with improved performance that does not require the use of expensive conductive carbon blacks, is mar resistant, can survive conductor preheating, and uses a lower cost blend of polymers as performance must always be balanced with cost in the manufacture of electric cable.

SUMMARY OF THE INVENTION

It is an object of the present invention to provide a conductor shield material with improved performance without the need for expensive additives, complex polymer formulations, or specially prepared carbon black. Conductor shields and cables with conductor shields made in accordance with the present invention exhibit superior performance over time as demonstrated by accelerated water tree testing (AWTT) and impulse testing as compared to conventional high performance conductor shield compositions.

The present invention is based on the discovery that improved semiconductor shields may be formed by dispersing certain selected carbon blacks in a linear, single-site catalyzed ethylene polymer combined with Ziegler Natta or free radical catalyzed polyethylene. It is an object of the present invention provides a vulcanizable semiconductive shield composition, comprising: (a) a linear, single-site catalyzed polymer comprising ethylene polymerized with at least one comonomer selected from the group consisting of $C_3$ to $C_{20}$ alpha-olefins, (b) low density polyethylene (LDPE) and linear low density polyethylene (LLDPE), and mixtures thereof (c) a carbon black (c) an antioxidant, and (d) a cross linking agent.

Semiconductive shields made of the inventive compositions have significantly improved physical properties, such as, low water vapor transmission and smooth interfaces, as well as better processability compared to known semiconductive shields. In addition, the semiconductive shield compositions do not abrade or corrode extrusion equipment.

It is a further object of the present invention to provide a semiconductive shield for the conductor or insulation in a power cable formed by extruding the composition over the conductor or insulation of the power cable and the resulting power cable that employs the composition as a conductor shield.

The present invention provides a conductor shield material with both low cost and improved performance. In particular, the composition of the invention, conductor shields and cables made with conductor shields in accordance with the invention exhibit superior performance over time as demonstrated by AWTT (Accelerated Water Treeing Test) values as well as improved impulse strength values as compared to conductor shield compositions using conventionally available compounds.

It is a further object of the present invention to provide a vulcanizable semiconductive shield composition, comprising: (a) a linear, single-site catalyzed polymer comprising ethylene polymerized with at least one comonomer selected from the group consisting of $C_3$ to $C_{20}$ alpha-olefins; (b) polyethylene; (c) a carbon black selected from the group consisting of a furnace carbon black that contains ash in an amount of 50 ppm or less, sulfur in an amount of 50 ppm or less, and has crystal dimensions $L_a$ and $L_c$ of 30 Å or less, an acetylene carbon black, and a furnace carbon black having an ASTM grade of N-351, the carbon black having particle size from about 15 nm to about 22 nm, an Iodine number of from about 115 mg/g to about 200 mg/g, and a DBP number of from about 90 $cm^3$/100 g to about 170 $cm^3$/100 g.; (d) an antioxidant; and (e) a cross linking agent.

It is a still further object of the present invention to provide methods of making the cables and the semiconductive materials described herein.

DETAILED DESCRIPTION OF PREFERRED EMBODIMENTS

The present invention provides a vulcanizable semiconductive shield composition, comprising: (a) a linear, single-site catalyzed polymer comprising ethylene polymerized with at least one comonomer selected from the group consisting of $C_3$ to $C_{20}$ alpha-olefins; (b) a carbon black selected from the group consisting of a furnace carbon black that contains ash in an amount of 50 ppm or less, sulfur in an amount of 50 ppm or less, and has crystal dimensions $L_a$ and $L_c$ of 30 Å or less, an acetylene carbon black, and a furnace carbon black having an ASTM grade of N-351; the carbon black having particle size from about 15 nm to about 22 nm, an Iodine number of from about 115 mg/g to about 200 mg/g, and a DBP number of from about 90 $cm^3$/100 g to about 170 $cm^3$/100 g; and (c) a cross linking agent.

Compared to known "supersmooth, extra clean" (high performance) shield compositions typically based on acetylene carbon blacks, the semiconductive shield compositions of the present invention have been found to provide equivalent dispersion and smoothness at the shield/insulation interface, and enhanced physical, electrical and processing properties with a varity of carbon blacks.

Conventional Ziegler-Natta catalysts used for polyolefin synthesis contain many reactive sites on their surfaces; reactivity levels vary from site to site, causing variations in the polymers produced. Single-site catalysts also have many sites, but the sites are identical. This allows resins to be made which maximize desired physical properties, like toughness, by closely replicating, in polymer after polymer, the same molecular arrangement and weight. The result is a resin that is narrower in molecular weight distribution (MWD) than conventional linear polyethylene. These may be difficult to process or cause so called melt fracture or sharkskin at higher extrusion speeds even though they appear smooth in lab extrusion. Conventional Ziegler-Natta catalysts used for polyolefin with variations in the polymers produced have a broader molecular arrangement and weight and give smoother extrudate. They are less flexible and cannot, however, accept the large amounts of carbon black filler necessary to render a composition conductive enough for use in a cable. Conventional Ziegler-Natta linear low density polyethylene (LLDPE) homopolymer, free radical low density polyethylene (LDPE) copolymers and VLDPE polymers have been produced for many years by a number of polymer companies and are very well known in the art.

Useful linear, single-site (also called metallocene) catalyzed ethylene polymers are disclosed in U.S. Pat. No. 5,246,783, the entire disclosure of which is incorporated herein by reference. The preferred polymers are linear, single-site catalyzed polymers comprising ethylene polymerized with at least one comonomer selected from $C_3$ to $C_{20}$ alpha-olefins. Linear, single-site catalyzed polymers are commercially available and require no special modification to be useful in practicing the present invention.

Examples of useful polymers include linear, single-site catalyzed ethylene/butene-1 copolymers, ethylene/propylene copolymers, ethylene/hexene-1 copolymers, ethylene/octene-1 copolymers, ethylene/propylene/1,4-hexadiene terpolymers, and ethylene/butene-1/1,4-hexadiene terpolymers. Ethylene/butene copolymers, ethylene/propylene copolymers, ethylene/octene copolymers, and ethylene/hexene copolymers are most preferred. The higher alpha-olefins tend to provide improved physical properties.

Examples of polymer copolymers (or carboxylates) are vinyl acetate, vinyl butyrate, vinyl pivalate, vinyl neo-nonanoate, vinyl neodecanoate, and vinyl 2-ethylhexanoate. Vinyl acetate is preferred. Examples of acrylic and methacrylic acid esters are lauryl methacrylate; myristyl methacrylate; palmityl methacrylate; stearyl methacrylate; 3-methacryloxy-propyltrimethoxysilane; 3-methacryloxypropyltriethoxysilane; cyclohexyl methacrylate; n-hexylmethacrylate; isodecyl methacrylate; 2-methoxyethyl methacrylate; tetrahydrofurfuryl methacrylate; octyl methacrylate; 2-phenoxyethyl methacrylate; isobornyl methacrylate; isooctylmethacrylate; octyl methacrylate; isooctyl methacrylate; oleyl methacrylate; ethyl acrylate; methyl acrylate; t-butyl acrylate; n-butyl acrylate; and 2-ethylhexyl acrylate. Methyl acrylate, ethyl acrylate, and n- or t-butyl acrylate are preferred. The alkyl group may be substituted, for example with an oxyalkyltrialkoxysilane.

The linear, single-site catalyzed polymer preferably has a density of about 0.9 g/cm$^3$, although polymers having a broad range of densities may be used depending on cost restraints. The polymer preferably has a weight average molecular weight of from about 30,000 to about 70,000. Most preferably, the polymer has a weight average molecular weight of about 42,500, a number average molecular weight of about 20,000, and a Z average molecular weight of about 66,700. The polymer preferably has a polydispersity of from about 1.8 to about 2.5, most preferably about 2.15.

The linear, single-site catalyzed polymer's narrow molecular weight distribution (polydispersity) and narrow compositional distribution contribute to the unique performance of the resin base when combined with specific carbon blacks. "Composition distribution" refers to the distribution of comonomer between polymer molecules, and is directly related to crystallizability, hexane extractability, toughness, and filler acceptance. The selected single-site catalyzed resins have a narrow compositional distribution, i.e., all the polymer molecules (chains) tend to have the same comonomer content throughout the entire resin sample regardless of the molecular weight of the chain.

The selected single-site catalyzed resins demonstrate the superior physical properties to typical linear low density polyethylene (LLDPE) homopolymer, low density polyethylene (LDPE) copolymers and VLDPE polymers.

The linear, single-site catalyzed polymer is preferably present in the semiconductive shield composition in an amount of from about 50 to about 70 weight percent of the total formulation. The shield's final composition depends on the amounts of other components added to the resin, as is described below.

In the present invention, commercially available, conventional carbon black is added to the polymer compositions to impart semi-conductive properties to the composition. The ability to use such commercially available, conventional carbon blacks to achieve improved AWTT results is an advantage of the invention. The carbon black added to the polymer may be one of the various commercially available conventional carbon blacks, including finely divided carbon such as lamp black, furnace black, or acetylene black, i.e. carbon black made by pyrolyzing acetylene. Ketjin black may be used in the compositions of the invention as well as many of the commercial carbon black grades described in ASTM D 1765 98b, for example N293 and N550. Furnace carbon blacks having an ASTM grade of N-351, which contain conventional sulfur and ash levels, have also successfully been used according to the invention, although their cleanliness (low ionics) is not equivalent to the low sulfur/ash furnace blacks described above. Acetylene carbon blacks have also been found to provide unexpected improvements in physical properties and processability when combined with linear, single-site catalyzed polymers. Carbon black having particle size from about 15 nm to about 22 nm, an Iodine number of from about 115 mg/g to about 200 mg/g, and a DBP number of from about 90 cm$^3$/100 g to about 170 cm$^3$/100 g can be used in the invention. Preferably, to avoid problems associated with carbon black dust, the carbon black is pelletized, although non-pelletized carbon black, such as in its fluffy form, may also be used with equal success. The carbon black is generally present in the composition in the amount of from about 0.1% to about 65% by weight of the polymer composition. Preferably the carbon black is present in an amount of from about 10% to about 50% by weight, based on the weight of the total composition. Furnace carbon blacks that contain ash in an amount of 50 ppm or less, sulfur in an amount of 50 ppm or less, and have crystal dimensions $L_a$ and $L_c$ of 30 Å or less are readily dispersible in the linear, single-site catalyzed polymer and provide an extremely smooth interface with a power cable's insulation layer. Due to its low surface area, this type of carbon black has a lower conductivity than typical furnace blacks such as P-type and N-472 ASTM grade blacks; however, it is also less reinforcing. Thus, a low viscosity shield composition having excellent physical properties may be provided, while dispersing a high level of carbon black in the resin. A high carbon black loading (from about 30 to 45 weight percent) most preferably is needed for the shield to exhibit adequate electrical conductivity.

A tremendous number of compounds have been suggested for use as additives in semiconducting shield compositions. Typically, these compounds fall into the categories of antioxidants, curing agents, vulcanizing agents, cross linking agents, boosters and retardants, processing aids, pigments, dyes, colorants, fillers, coupling agents, ultraviolet absorbers or stabilizers, antistatic agents, nucleating agents, slip agents, plasticizers, lubricants, viscosity control agents, tackifiers, anti-blocking agents, surfactants, extender oils, acid scavengers, and metal deactivators. Although processing aids are not necessary to achieve homogeneous blends and reduced viscosity, metal stearates or salts, polysiloxanes, and/or polyethylene glycols (with molecular weights of from about 10,000 to about 30,000) may be incorporated into the products of the present invention to further enhance these properties. Processing aids, when present, are generally used in amounts of from about 0.1 to about 5.0 weight percent, based on the total weight of the semiconductive shield composition.

Non-limiting examples of antioxidants are: hindered phenols such as tetrakis[methylene(3,5-di-tert-butyl-4-hydroxyhydro-cinnamate)]methane; bis[(beta-(3,5-ditert-butyl-4-hydroxybenzyl)-methylcarboxyethyl)]sulphide, 4,4'-thiobis(2-methyl-6-tert-butylphenol), 4,4'-thiobis(2-tert-butyl-5-methylphenol), 2,2'-thiobis(4-methyl-6-tert-butylphenol), and thiodiethylene bis(3,5-di-tert-butyl-4-hydroxy)hydrocinnamate; phosphites and phosphonites such as tris(2,4-di-tert-butylphenyl)phosphite and di-tert-butylphenyl-phosphonite; thio compounds such as dilaurylthiodipropionate, dimyristylthiodipropionate, and distearylthiodipropionate; various siloxanes; polymerized 2,2,4-trimethyl-1,2-dihydroquinoline (TMQ), n,n'-bis(1,4-dimethylpentyl-p-phenylenediamine), alkylated diphenylamines, 4,4'-bis(alpha, alpha-demthylbenzyl)diphenylamine, diphenyl-p-phenylenediamine, mixed di-aryl-p-phenylenediamines, and other hindered amine antidegradants or stabilizers. Antioxidants can be used in amounts of about 0.1 to about 5 percent by weight based on the weight of the composition.

Non-limiting examples of curing/cross linking agents are as follows: dicumyl peroxide; bis(alpha-t-butyl peroxyisopropyl)benzene; isopropylcumyl t-butyl peroxide; t-butylcumylperoxide; di-t-butyl peroxide; 2,5-bis(t-butylperoxy)2,5-dimethylhexane; 2,5-bis(t-butylperoxy)2,5-dimethylhexyne-3; 1,1-bis(t-butylperoxy)3,3,5-trimethylcyclohexane; isopropylcumyl cumylperoxide; di(isopropylcumyl) peroxide; or mixtures thereof. Peroxide curing agents can be used in amounts of about 0.1 to 5 percent by weight based on the weight of the composition.

A number of compounds have been suggested for use as additives in semiconducting shield compositions. Typically, these compounds fall into the categories of, boosters and retardants, processing aids, pigments, dyes, colorants, fillers, coupling agents, ultraviolet absorbers or stabilizers, antistatic agents, nucleating agents, slip agents, plasticizers, lubricants, viscosity control agents, tackifiers, anti-blocking agents, surfactants, extender oils, acid scavengers, and metal deactivators.

The polymer compositions of the present invention may be manufactured using conventional machinery and methods to produce the final polymer product. The compositions may be prepared by batch or continuous mixing processes such as those well known in the art. For example, equipment such as Banbury mixers, Buss cokneaders, and twin screw extruders may be used to mix the ingredients of the formulation. The components of the polymer compositions of the present invention may be mixed and formed into pellets for future use in manufacturing electrical cable.

The composition of the invention, and conductor shields and cables made with conductor shields in accordance with the invention exhibit superior performance over time as demonstrated by accelerated cable life testing (AWTT) as compared to conventional high performance conductor shield compositions. While the connection between smoothness of the conductor shield may or may not be related to the improved ACLT values, the compositions of the invention, when used in a conductor shield, may nonetheless achieve a count of surface imperfections/m$^2$ of 5 or less larger than 70 micron, preferably a count of surface imperfections/m$^2$ 0 or none larger than 70 micron In certain embodiments, the present invention provides a vulcanizable semiconductive shield composition, comprising: (a) a linear, single-site catalyzed polymer comprising ethylene polymerized with at least one comonomer selected from the group consisting of $C_3$ to $C_{20}$ alpha-olefins, (b) LLDPE, (c) a carbon black selected from the group consisting of a furnace carbon black that contains ash in an amount of 50 ppm or less, sulfur in an amount of 50 ppm or less, and has crystal dimensions $L_a$ and $L_c$ of 30□ or less, an acetylene carbon black, and a furnace carbon black having an ASTM grade of N-351, and (d) a cross linking agent A further embodiment of the present invention relates to a cable comprising a conductive core and at least one semiconducting layer surrounding the conductive core, said at least one semiconducting layer comprising
 a) about 55 percent to about 75 by weight of a base polymer; and
 b) about 25 percent to about 45 percent by weight of carbon black having particle size from about 15 nm to about 22 nm, an Iodine number of from about 115 mg/g to about 200 mg/g, and a DBP number of from about 90 cm$^3$/100 g to about 170 cm$^3$/100 g.

Ethylene/1-butene or ethylene/octene with a density of about 0.70-0.90, and a melt index of about 5-50 are preferred for use as the base polymer of the invention. Preferably, the polymer is present in an amount from about 55% to about 75% by weight.

The LDPE, LLDPE or VLDPE preferably has a density of about 0.90 and a melt index of between 10 and 50. Most preferably the linear, single-site catalyzed polymer and LDPE, LLDPE or VLDPE have roughly similar melt index to prevent 2 phases from forming.

In a further embodiment of the invention a polar ethylene copolymer is mixed with the LDPE. It was found that by carefully selecting the polar copolymer and the LDPE, two phases do not form as the polar copolymer is mixed with the LDPE. The polymer ethylene copolymer should preferably have no more than 20% co monomer content and the LDPE should have a melt index 50% greater than the polar ethylene copolymer.

In the present invention, carbon black is added to the polymer compositions to impart semi-conductive properties to the composition. Preferably the carbon black is present in an amount of from about 25% to about 45% by weight, based on the weight of the total composition.

EXAMPLE

Power cables were prepared with a 1/0 19 wire stranded aluminum conductor surrounded by a 15 mm conductor shield having a composition of the prior art as specified in Table 1 surrounded by a 60 mm layer of cross-linked polyethylene insulation (Dow HFDE 4201) surrounded by a 35 mm layer of semiconductive insulation shield made from General Cable Corp LS567A. The conductor shield was extruded first, then the insulation and outer shield components were extruded over the conductor simultaneously on a Davis standard tandem extruder and dry cured under pressurized nitrogen in a continuous catenary vulcanization tube, and then water cooled. A copper mesh was then wrapped around the insulation shield to provide the ground path for the shortout in the ACLT test. Cables were preconditioned for 72 hrs at 90° C. conductor temperature then placed in a tank of 50 C water and energized to 26 Kv. Power was on for 8 hrs off for 16 hrs. Failure times were analyzed with Weibull statistics and the B63% life calculated. Examples were tested for protrusion count on a Svante Bork Uniop® laser profilerimiter. Based on the poor performance in this test these formulas were not selected for the longer AWTT evaluation

TABLE

|  | Ex 1 (% by weight) | Ex 2 (% by weight) |
|---|---|---|
| EVA 33% 25 mi | 61 | 37.5 |
| EVA 18% 20 mi |  |  |
| LDPE 0.917 density 2 mi |  | 20 |
| TMQ antioxidant | 1 | .5 |
| N550 carbon black | 38 | 28 |
| N351 carbon black |  |  |
| Calcium carbonate |  | 14 |
|  | 100% | 100% |
| Organic peroxide | 1.5 | 1.5 |
| Uniop ® protrusion count 70 micron | 6 | 208 |
| Uniop ® protrusion count 120 micron | 1 | 5 |
| B63% life on test days | 99 | 38 |

Accelerated Water Treeing Test (AWTT) and Impulse Test

The AWTT and impulse tests were performed according to the Association of Edison Illuminating Companies (AEIC) Specification CS6-87. Power cables were prepared with a 1/0 19 wire stranded aluminum conductor surrounded by a 15 mm conductor shield having a composition as specified in Table 2, surrounded by a 175 mm layer of cross-linked ethylene propylene rubber insulation (General Cable designation EI 4728, Commercially available from Indianapolis Compounds as IC4728) surrounded by a 35 mm layer of semiconductive insulation shield made from General Cable Corp LS766A. A copper mesh was then wrapped around the insulation shield to provide the ground path for the shortout in the AWTT test. The conductor shield was extruded first, then the insulation and outer shield components were extruded over the conductor simultaneously on a Davis standard tandem extruder and dry cured under pressurized nitrogen in a continuous catenary vulcanization tube, and then water cooled.

Smoothness was measured on extruded tapes by visual inspection. Mar resistance was measured on extruded tapes by visual inspection Examples 1, 3 and 5 were tested for protrusion count on a Svante Bork Uniop® laser profilerimiter Crosslink density was measured with a Monsano MDR2000 moving disk Rheometer.

Preheat temperature is the maximum temperature the conductor can be preheated before the conductor shield material begins to melt and sag away from the conductor causing deformation and the cable to fail electrically The semiconductive shield composition may be manufactured using conventional machinery and methods known in the industry. The compositions may be prepared by batch or continuous mixing processes well known in the art. Equipment such as Banbury mixers, Buss co-kneaders, and twin screw extruders may be used to mix the ingredients of the formulation. For instance, the components of the semiconductive shield composition may be mixed and formed into pellets for future use in manufacturing insulated electrical conductors such as power cables.

The semiconductive shield composition may be incorporated into any product where its properties are suitable. The semiconductive shield composition is particularly useful for making insulated electrical conductors such as electrical wires and power cables. As described above, the semiconductive shield is conventionally formed directly over the inner electrical conductor as a conductor shield or over the insulation material as a bonded insulation shield.

Insulated electrical conductors containing the semiconductive shield may be manufactured using conventional equipment and known techniques, such as two-pass extrusion or single-pass true-triple extrusion. In a true-triple extrusion process, the semiconductive conductor shielding layer, insulation layer, and overlying semiconductive insulation shielding layer are extruded in a common extrusion head and cured (crosslinked) simultaneously in a single step.

In a two-pass extrusion process (dual-tandem extrusion), the conductor shield and insulation are first extruded in tandem and crosslinked prior to extruding and cross linking the semiconductive insulation shield layer. Alternatively, a tandem extrusion process may be carried out in which the conductor shield is first extruded, followed by extrusion of the insulation and insulation shield in a dual extrusion head.

TABLE 2

| (% by weight) | Ex 1 | Ex 2 | Ex 3 | Ex 4 | Ex 5 | Invention |
|---|---|---|---|---|---|---|
| EB | 58.5 |  | 62.5 |  | 59.5 |  |
| EO |  | 58.5 |  |  |  | 45 |
| LDPE |  |  |  |  |  | 15.5 |
| EVA |  |  |  |  |  |  |
| EEA |  |  |  | 58.5 |  |  |
| TMQ 60 C. melt |  |  |  | .5 |  |  |
| TMQ 120 C. melt | .5 | .5 | .5 |  | .5 | .5 |
| N110 carbon |  |  | 37 |  |  |  |
| N351 carbon | 41 | 41 |  | 41 |  | 39 |
| Carbon 3 |  |  |  |  | 40 |  |
|  | 100% | 100% | 100% | 100% | 100% | 100% |
| Dicumyl peroxide | 1.7 | 2 | 1.7 | 1.5 | 1.7 | 1.6 |
| Impulse Strength V/mil | 1185 | 1430 | 1695 | 1490 | 1750 | 1780 |
| AWTT 360 day breakdown V/mil | 435 | 390* | 580 | Fot | Fot | 455 |
| VisualSmoothness | Best | good | poor | good | good | Very good |
| Uniop ® protrusion count 70 micron | 0 |  | 1000 |  | 1 | 0 |

TABLE 2-continued

| (% by weight) | Ex 1 | Ex 2 | Ex 3 | Ex 4 | Ex 5 | Invention |
|---|---|---|---|---|---|---|
| Uniop ® protrusion count 120 micron | 0 | | 6 | | 0 | 0 |
| Crosslink density | Good | Poor | good | good | good | Best |
| Mar resistance | Very good | Poor | good | good | Very good | Best |
| Preheat temp | 90 C. | 75 C. | 80 C. | 90 C. | 90 C. | 100 C. |
| Cost ranking 1 = lowest | 2 | 2 | 3 | 5 | 4 | 1 |

*measured at 180 days, test terminated

Fot-one or more samples electrically shorted out or broke down before 360 days thus failing the test.

Materials

The following materials were used in forming the compositions described in this Example.

Carbon 3—oil absorption 165, Nitrogen surface area 52, particle size 43 nm.

EB—Exact 3017 Exxon Mobil (Houston, Tex.).
EO—Engage 8401 Dow (Midland, Mich.).
LDPE—Equistar NA 249 (Houston, Tex.)

The TMQ used is available from RT Vanderbilt Company, Inc. of Norwalk, Conn. under the designation Agerite Resin D.

Current industry standards limit protrusions from the conductor shield materials to 120 μm and most customers and cable makers would consider protrusions from the conductor shield of more than 70 μm, undesirable. Products incorporating the present invention may readily meet these standards. Example 2 does not. Semiconductive shields provided by the invention show better toughness, abrasion resistance and surprisingly show better retained breakdown strength after 360 day AWTT than products prepared according to the prior art. The invention surprisingly shows higher impulse strength. An impulse strength test simulates lightning striking the ground near where a cable is buried or a switching surge of electricity. An additional advantage is that the conductor can be preheated to a higher temperature and has better crosslink density which allows the cable to be manufactured at a higher speed. The added advantage of improved crosslink density is that even if all of the peroxide is not consumed there can still be enough cross links to provide adequate performance, again allowing higher production speed and lower cable cost. Less carbon black may advantageously be used while obtaining better mar resistance, giving lower density and more feet of cable per lb of compound. The invention surprisingly combines the lowest manufacturing cost, material cost, highest retained breakdown strength after ageing and highest impulse strength. The latter 2 properties may be due to the high mar resistance. It is expected that incorporating the prior art carbon blacks, antioxidants and additives may improve the performance of the invention.

The foregoing embodiments are intended to illustrate and not limit the invention. It will be apparent that various modifications can be made without departing from the spirit and scope of the invention as defined by the appended claims.

What is claimed is:

1. A vulcanizable semiconductive shield composition, comprising:
   (a) a linear, single-site catalyzed polymer comprising ethylene polymerized with at least one comonomer selected from the group consisting of C3 to C20 alpha-olefins;
   (b) LDPE; and
   (c) a carbon black selected from the group consisting of a furnace carbon black that contains ash in an amount of 50 ppm or less, sulfur in an amount of 50 ppm or less, and has crystal dimensions $L_a$ and $L_c$ of 30 Å or less, and a furnace carbon black having an ASTM grade of N-351, wherein the component in (a) is different from the component in (b).

2. The vulcanizable semiconductive shield composition of claim 1, further comprising:
   (d) an antioxidant; and
   (e) a cross linking agent.

3. The vulcanizable semiconductive shield composition of claim 1, wherein the carbon black is present in an amount of from about 30 to about 45 weight percent, based on the total weight of the semiconductive shield composition.

4. The vulcanizable semiconductive shield composition of claim 1, wherein the linear, single-site catalyzed polymer is polymerized using a metallocene catalyst system.

5. The vulcanizable semiconductive shield composition of claim 1, wherein the linear, single-site catalyzed polymer is selected from the group consisting of: ethylene/butene-1 copolymers, ethylene/propylene copolymers, ethylene/hexene-1 copolymers, ethylene/octene-1 copolymers, ethylene/propylene/1,4-hexadiene terpolymers, and ethylene/butene-1/1,4-hexadiene terpolymers.

6. The vulcanizable semiconductive shield composition of claim 1, wherein the linear, single-site catalyzed polymer has a weight average molecular weight of from about 30,000 to about 70,000.

7. The vulcanizable semiconductive shield composition of claim 1, wherein the linear, single-site catalyzed polymer has a polydispersity of from about 1.8 to about 5.

8. The vulcanizable semiconductive shield composition of claim 1, wherein the linear, single-site catalyzed polymer has a polydispersity of about 2-3.

9. The vulcanizable semiconductive shield composition of claim 1, wherein the linear, single-site catalyzed polymer is present in an amount of from about 50 to about 70 weight percent, based on the total weight of the semiconductive shield composition.

10. The vulcanizable semiconductive shield composition of claim 2, wherein the cross linking agent is an organic peroxide cross linking agent, present in an amount of from about 0.5 to about 5 weight percent, based on the total weight of the linear, single-site catalyzed polymer.

11. The vulcanizable semiconductive shield composition of claim 10, wherein the organic peroxide cross linking agent is selected from the group consisting of: α,α'-bis(tert-butylperoxy)-diisopropylbenzene, dicumyl peroxide, di(tertiarybutyl)peroxide, and 2,5-dimethyl-2,5-di(t-butylperoxy)-hexane.

12. The vulcanizable semiconductive shield composition of claim 1, wherein the LDPE is present in an amount of from about 5 to about 50 weight percent, based on the total weight of the semiconductive shield composition.

13. The vulcanizable semiconductive shield composition of claim 1, further comprising from about 0.2 to about 2.0 weight percent, based on the total weight of the semiconductive shield composition, of an antioxidant selected from the group consisting of polymerized 1,2-dihydro-2,2,4-trimethylquinoline, and octadecyl 3,5-di-tert-butyl-4-hydroxyhydrocinnamate.

14. The vulcanizable semiconductive shield composition of claim 1, further comprising a processing aid selected from the group consisting of polyethylene glycols having an average molecular weight of from about 10,000 to about 30,000, metal stearates or salts thereof, polysiloxanes, and mixtures thereof.

15. An insulated electrical conductor comprising an electrically conductive member and a vulcanizable semiconductive shield formed over the electrically conductive member, the vulcanizable semiconductive shield comprising:
(a) a linear, single-site catalyzed polymer comprising ethylene polymerized with at least one comonomer selected from the group consisting of $C_3$ to $C_{20}$ alpha-olefins;
(b) LDPE; and
(c) a carbon black selected from the group consisting of a furnace carbon black that contains ash in an amount of 50 ppm or less, sulfur in an amount of 50 ppm or less, and has crystal dimensions $L_a$ and $L_c$ of 30 Å or less, and a furnace carbon black having an ASTM grade of N-351, wherein the component in (a) is different from the component in (b).

16. A method of manufacturing an insulated electrical conductor, comprising:
(a) extruding a vulcanizable semiconductive shield over an electrically conductive member, the vulcanizable semiconductive shield having a composition comprising:
(i) a linear, single-site catalyzed polymer comprising ethylene polymerized with at least one comonomer selected from the group consisting of $C_3$ to $C_{20}$ alpha-olefins,
(ii) LPDE, and
(iii) a carbon black selected from the group consisting of a furnace carbon black that contains ash in an amount of 50 ppm or less, sulfur in an amount of 50 ppm or less, and has crystal dimensions $L_a$ and $L_c$ of 30 Å or less, and a furnace carbon black having an ASTM grade of N-351, wherein the component in (i) is different from the component in (ii);
(b) extruding an insulation layer and an insulation shield over the vulcanizable semiconductive shield; and
(c) curing the vulcanizable semiconductive shield, insulation layer, and insulation shield to form an insulated electrical conductor.

* * * * *